D. WOROBOW.
FOLDABLE PUSHMOBILE.
APPLICATION FILED MAR. 15, 1920.
1,387,675.
Patented Aug. 16, 1921.
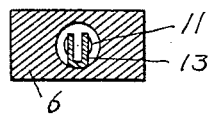
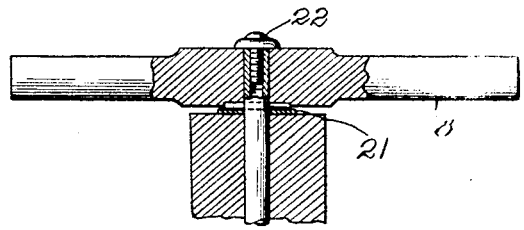
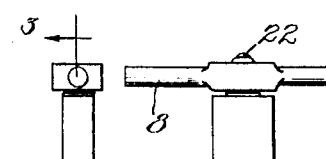
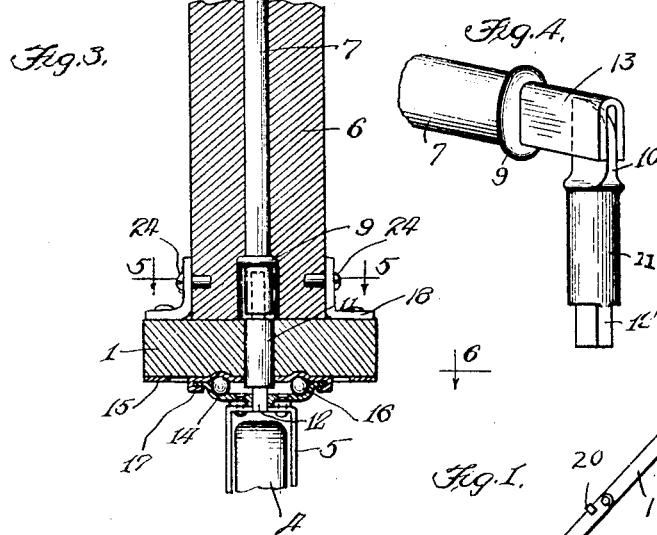
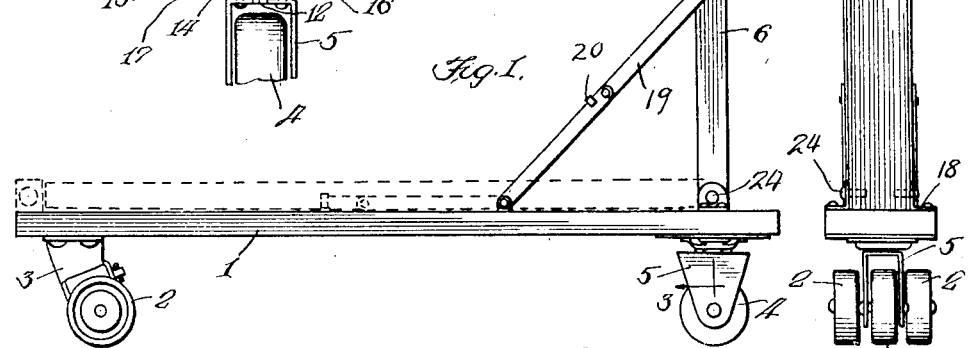
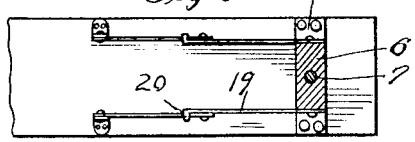
Inventor:
David Worobow
by Albert Scheith
Attorney

UNITED STATES PATENT OFFICE.

DAVID WOROBOW, OF CHICAGO, ILLINOIS.

FOLDABLE PUSHMOBILE.

1,387,675.   Specification of Letters Patent.   Patented Aug. 16, 1921.

Application filed March 15, 1920. Serial No. 365,822.

*To all whom it may concern:*

Be it known that I, DAVID WOROBOW, citizen of Russia, residing at Chicago, in the county of Cook and State of Illinois, have invented certain new and useful Improvements in Foldable Pushmobiles; and I do hereby declare the following to be a full, clear, and exact description of the invention, such as will enable others skilled in the art to which it appertains to make and use the same.

My invention relates to vehicles of the class commonly known as "pushmobiles," or of vehicles used by children and adapted to be propelled by one foot of the child while the latter is standing with his other foot on the platform of the vehicle and is guiding the latter through a suitable steering wheel. Such pushmobiles as at present on the market have been unsatisfactory in two respects, one being the difficulty of readily steering the same and the other being the space occupied by the vehicle when it is not in use. In some instances, such vehicles have been built with the steering handle arranged so that it would be swung down close to the platform, but such vehicles have then lacked the rigid angular disposition of the steering shaft with respect to the platform of the vehicle which is necessary for insuring a positive steering of the vehicle and for avoiding accidents.

To overcome these and other objections to such pushmobiles as heretofore constructed, my invention aims to provide a vehicle of this class in which the steering shaft can readily be swung down close to the platform, and in which this shaft is firmly supported with its axis in a predetermined position when the vehicle is unfolded for use. It also aims to provide novel and easily assembled means for transmitting the steering motion from the handle to the steering wheel without interfering with this folding, to provide anti-friction bearings for the steering wheel so as to facilitate the steering of the vehicle, and to provide a construction which will permit a ready and advantageous assembling of the various parts which coöperate both in the steering and in permitting the folding of the vehicle and the unfolding of the latter to a firm structure.

Still further objects of my invention will appear from the following specification and from the accompanying drawings, in which—

Figure 1 is a side elevation of a vehicle embodying my invention.

Fig. 2 is a front elevation of the same.

Fig. 3 is an enlarged and fragmentary section taken vertically along the axis of the steering rod.

Fig. 4 is a fragmentary perspective view of the member which operatively connects the steering rod with the front wheel of the vehicle, and of the lower end of the steering rod.

Fig. 5 is a transverse horizontal section taken along the correspondingly numbered line of Fig. 3.

Fig. 6 is a fragmentary horizontal section taken along the correspondingly numbered line in Fig. 1.

In the embodiment of the drawings, the vehicle of my invention includes a platform 1, desirably of wood and supported by three wheels, of which the rear wheels 2 are pivoted on a bracket 3 rigidly fastened to the underside of the platform. At its forward end, the platform is supported by a third wheel 4 pivoted in a bracket 5 which is connected to the platform 1 through a swivel connection as hereafter described more in detail. The platform 1 has a vertical perforation in alinement with the axis on which the bracket 5 is swiveled, and also carries a wooden riser or standard 6 having its axis normally vertical and in alinement with the same axis as the said perforation. The standard 6 has a central bore housing the major portion of a steering rod 7 which is rigidly secured at its upper end to a handle 8. Adjacent to the lower end of the standard 6, the bore through the latter is enlarged so as to receive a shoulder 9 on the steering rod 7, which shoulder prevents the rod from being pulled out of the standard 6 by lifting the handle 8. The steering member 7, although here designated as a rod, is desirably made of steel tubing, partly to lighten the same and partly to permit the lower end of the same to be formed into a channel open toward the rear of the vehicle and having flat sides adapted to fit slidably over the sides of a tang 10 on a member which operatively connects the steering rod 7 with the bracket 5. This tang 10 desirably is a flattened portion surmounting a shank 11 which is flattened at its lower end into another tang 12, substantially as shown in Figs. 4 and 5. This tang 12 is adapted to fit slidably into a correspondingly shaped socket in the top of the bracket 5, while the tang 10 fits between the said flat sides of the end 13 of the steering rod, so that these two tangs coöperate in interlocking the steering rod and the bracket 5, and consequently cause any rotation of the rod 7 through the handle 8 to have a corresponding rotational effect on the bracket 5. To facilitate the resulting steering in spite of the friction due to the weight on the vehicle, I desirably connect the bracket 5 to the platform 1 through a swiveling caster arrangement, as for example after the manner shown in Fig. 3. In this figure, the bracket 5 shown as riveted to the bottom 14 of a casing which has a plate 15 for its top and which casing houses a series of balls 16. The top 15 desirably has lugs 17 overhanging the edge portions of the bottom 14 to hold the two parts normally in coöperating position while readily permitting the rotation of the bottom 14 with respect to the top 15 which is rigidly screwed or riveted to the platform 1.

To permit of a compact storing and shipping of my vehicle, I pivot the standard 6 upon alined pins 24 respectively carried by a pair of brackets 18 secured to the top of the base 1, and also connect it to this base through articulated braces 19 each of which has a lug 20 adapted to limit the unfolding of the brace and to assist in holding the brace rigid when unfolded. Thus arranged, the braces 19 normally hold the standard rigid upon the base, thus affording a firm support against which the child riding on the vehicle may lean while propelling the same. However, upon pulling the pivotal joints of the braces slightly upward or backward, these braces can readily be folded upon themselves, thus permitting the entire standard to be laid down flat on the top of the base 1 as shown in dotted lines in Fig. 1. In doing this, the channel end 13 of the steering rod tilts back over the tang 10 as shown in Fig. 4, so that these parts afford the equivalent of a pivotal connection between them although the intermediary member which has this tang is loosely inserted between the parts which it connects.

At its upper end, the steering rod 7 is connected to the handle 8 in any suitable manner, as for example by inserting a transverse pin 21 through it and drawing this up by a screw 22 threaded into the end of the rod 7, so as to indent the pin 21 in the wooden handle 8. However, I do not wish to be limited to this or other details of the construction and arrangement above described, it being obvious that the same might be modified in many ways without departing from the spirit of my invention or from the scope of the appended claims.

I claim as my invention:

1. In a vehicle of the class described, a wheeled body having a forward wheel swiveled thereto, a standard pivoted to the body and normally extending upwardly in substantial alinement with the swiveled mounting of the forward wheel, a steering rod swiveled within the standard, and a pair of slidably interfitting elements fast respectively on the lower end of the steering rod and on the swivel mounting of the forward wheel, the said slidable interfitting elements being arranged for permitting the standard and the steering rod to be folded down close to the body of the vehicle.

2. In a vehicle of the class described, a body having a substantially vertical perforation near its forward end, a forward wheel mounted below the said perforation, a steering rod mounted on the body above the said perforation, and a connecting member extending through the perforation and operatively connecting the steering rod with the mounting of the forward wheel, both the steering rod and the said mounting being secured to the said body independent of the connecting member and the latter being held in operative position solely by the mounting of the parts connected thereby.

3. In a vehicle of the class described, a body having a substantially vertical perforation near its forward end, a forward wheel swiveled to the body below the said perforation, a steering rod carried by the body above the said perforation and mounted for rotation about both a vertical and a horizontal axis, and a connecting member extending through the perforation and tenoned into both the steering rod and the swivel mounting for the forward wheel, the tenon connection with the steering rod being in substantial alinement with the horizontal axis to permit the steering rod to be folded down upon the body of the vehicle.

4. In a vehicle of the class described, a platform having a vertical perforation, a single forward wheel swiveled under the platform in axial alinement with said perforation, a riser normally extending upward from the said perforation and swiveled to the platform on a horizontal axis disposed above the platform and transversely of the vehicle, a steering rod carried by the riser and swiveled thereto on an axis longitudinal of the latter, and a connecting member extending through the perforation and having at its opposite ends tangs respectively engaging corresponding socket formations in the steering rod and in the mounting of the forward wheel.

5. In a vehicle, a platform, wheeled supports for the platform including a wheel swiveled under a perforation in the platform, foldable steering means connecting a normally elevated handle with the said swiveled wheel, and a standard housing the major portion of the steering means and pivoted to the platform independently of the steering means to permit its being swung down close to the platform, and articulated bracing connecting the platform with the standard and normally holding the standard substantially erect, the said major portion of the steering means being freely rotatable in the standard.

Signed at Chicago, Illinois, March 11th, 1920.

DAVID WOROBOW.